United States Patent
Oosthoek et al.

(10) Patent No.: US 6,687,655 B2
(45) Date of Patent: Feb. 3, 2004

(54) MAINTENANCE OF SLIDING WINDOW AGGREGATED STATE USING COMBINATION OF SOFT STATE AND EXPLICIT RELEASE PRINCIPLES

(75) Inventors: Simon Oosthoek, Enschede (NL); Martin Edvard Jacobsson, Enschede (NL); Georgios Karagiannis, Neede (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 161 days.

(21) Appl. No.: 10/051,570

(22) Filed: Jan. 17, 2002

(65) Prior Publication Data

US 2002/0156599 A1 Oct. 24, 2002

Related U.S. Application Data

(60) Provisional application No. 60/270,819, filed on Feb. 22, 2001.

(51) Int. Cl.[7] .............................. G06F 11/30; H04J 3/16; G01R 31/08
(52) U.S. Cl. .................. 702/186; 702/186; 709/226; 370/468; 370/230; 370/235
(58) Field of Search .................. 702/186, 182, 702/183; 709/223, 224, 225, 226, 227; 370/230, 231, 232, 235, 236, 237, 401, 412, 468

(56) References Cited

U.S. PATENT DOCUMENTS

| 5,778,245 | A | 7/1998 | Papworth et al. ........ 395/800.23 |
| 5,920,546 | A | 7/1999 | Hebert et al. ............... 370/260 |
| 6,031,841 | A | 2/2000 | Woundy ....................... 370/410 |
| 6,122,272 | A | 9/2000 | Tomaszewski et al. ..... 370/351 |
| 6,170,020 | B1 | 1/2001 | Blakeney et al. ............. 710/10 |
| 6,282,561 | B1 | 8/2001 | Jones et al. .................. 709/104 |

FOREIGN PATENT DOCUMENTS

| EP | 0 321 724 B1 | 9/1997 |
| EP | 0 993 212 A1 | 4/2000 |
| WO | WO 00/36851 A3 | 6/2000 |
| WO | WO 01/50782 A2 | 7/2001 |

OTHER PUBLICATIONS

L. Westberg, et al., Internet Draft, Resource Management inDiffserv Franework, *Resource Management in Diffserv (RMD) Framework,* IETF, draft–westberg–rmd–framework–00–txt, dated Apr. 2001.

(List continued on next page.)

*Primary Examiner*—John Barlow
*Assistant Examiner*—Meagan S. Walling

(57) ABSTRACT

A method is provided for reserving, maintaining and releasing resources in the interior nodes located within an interior network positioned between edge nodes, wherein requests belonging to corresponding data microflows that continually arrive at any interior node do not establish any microflow reservation states, but these requests can establish, maintain and release either a part of, or an entire aggregated reservation state, using a combination of reservation soft state and explicit release principles. A window is applied to establish a first time period, which includes a selected cell in a sequence of time cells and also includes a number of additional cells preceding the selected cell. Arrival of reserve and refresh requests during the selected cell is detected to generate an rfcount associated with the selected cell. The rfcount is combined with a lastsum associated with the preceding cells to form a newsum, which is used to manage resources in the interior network during a reservation period corresponding to the selected cell. Following the selected cell, the window is shifted to establish a second time period which includes the next cell in the sequence, and excludes the oldest cell of the first time period.

16 Claims, 2 Drawing Sheets

OTHER PUBLICATIONS

L. WestberG, et al., Internet Draft, RND On DemAnd PHR, *Resource Management in Diffserv On DemAnd (RODA) PHR,* IETF, draft–westberg–rmd–od–phr–00.txt, dated Apr. 2001.

F. Baker, et al., Internet Draft, RSVP Reservation Aggregation, *Aggregation of RSVP for IPv4 and IPv6 Reservations,* IETF, draft–ietf–issll–rsvp–aggr–02.txt, dated Mar. 2000.

L. Westberg, Internet Draft, Load Control, Load Control of Real–Time Traffic, *A Two–bit Resource Allocation Scheme,* IETF, draft–westberg–loadcntr–03.txt, dated Apr. 2000.

W. Fang, Internet RFC/STD/FYI/BCP Archives, RFC2859, The Internet Society, Network Working Group, *A Time Sliding Window Three Colour Marker (TSWTCM),* dated Jun. 2000.

S. Blake, et al., Roxen Community: RFC 2475, *An Architecture for Differentiated Services,* The Internet Society, community.roxen.com, dated Dec. 1998.

R. Braden, et al., Internet RFC/STD/FYI/BCP Archives, RFC2205, *Resource ReSerVation Protocol (RSVO)—Version 1 Functional Specification,* Internet Official Protocol Standards, Network Working Group, dated Sep. 1997.

MAINTENANCE OF SLIDING WINDOW AGGREGATED STATE USING COMBINATION OF SOFT STATE AND EXPLICIT RELEASE PRINCIPLES

CROSS REFERENCE TO RELATED APPLICATION

This application for patent claims the benefit of priority from, and hereby incorporates by reference the entire disclosure of, co-pending U.S. provisional application for patent serial No. 60/270,819, filed Feb. 22, 2001.

BACKGROUND OF THE INVENTION

The invention disclosed and claimed herein generally pertains to a method for dynamically reserving, maintaining and releasing resources in a network using quality of service (QoS) management architecture. More particularly, the invention pertains to a method of the above type wherein either a part or the whole aggregated reservation state is established, maintained and released using a combination of the soft state principle and the explicit release principle.

The increasing diversity of internet applications, from the most simple ones such as e-mail and web browsing to multimedia screening applications like IP Telephony and Videoconferencing, has raised the demand for Quality of Service in the Internet. On the other hand, in the highly competitive environment of Internet Service Providers (ISPs), satisfying customer needs regardless of whether they are other ISPs or end users is key to their survival. Therefore, the desire of ISPs to provide value-added services to their customers is growing immensely. These demands have led to the evolvement of QoS on the Internet as a necessity. Enabling QoS on the best effort Internet model introduces complexity in several areas, from applications, different networking layers and network architectures to network management and business models. All these aspects have been major research topics over the past few years. Finding an efficient solution for end-to-end QoS over an Internet that will satisfy both ISPs and their customers is very difficult.

Quality of service can be provided by dynamically reserving resources for a flow of data. When dynamic QoS is required, reservation states have to be created in the nodes between the source and destination of the flow. The reservation states can be kept either per flow or per aggregate, i.e., a bundle of flows or flows belonging to a certain category of traffic (also known as class of service, CoS). Currently, two types of QoS management are standardized in the Internet, which are referred to respectively as RSVP, for Resource Reservation Protocol, and Diffserv, for Differentiated Services. In RSVP QoS is maintained on a per flow basis. However, due to the non-trivial amount of storage and processing required in each intermediate node, RSVP does not scale well when going deeper into the core of the network where all flows come together. Thus, in real systems, RSVP is not scalable to very large internet networks.

Diffserv is a per aggregate QoS management system. Accordingly, Diffserv scales very well, because states are kept per class of service in each intermediate node and are subject to a fixed limit. However, Diffserv is generally unable to dynamically adjust to changing resource requirements between the various CoSs. More particularly, Diffserv is not flexible enough to accommodate requirements for changes in the amount of reservations per CoS.

Currently, a protocol and method known as Load Control is used to make Diffserv more flexible. This method is described, for example, in an Internet document entitled "Load Control of Real Time Traffic" Westberg et al., draft-westberg-loadcntr-03.txt, April 2000 (Work in progress). Load Control uses reservation and refresh requests to establish and maintain an aggregated reservation state in the interior network nodes. The ingress nodes to the interior network accept reservations for microflows, and then translate them into a resource request for the aggregated reservations in the interior nodes. The egress nodes deaggregate these flows and continue the QoS for a particular microflow to its destination. The algorithm in the interior nodes uses soft state principles and a global, optionally synchronized refresh period. In order to maintain a reservation, a refresh request must be sent at the end of each refresh period in a sequence of refresh periods. When a refresh request is not received for more than a refresh period, an associated part of the aggregated state is released back to the unused resources, ready to be reserved again. This arrangement is referred to as "soft-state" because there is an automatic change of state, that is, certain resources go from being reserved to not being reserved, if a refresh request is not timely received.

The load control method enables the internal aggregated reservation state to be reserved and maintained per external reservation request, without the interior nodes being required to keep state on a per flow basis. However, a significant disadvantage of Load Control is that resources cannot be explicitly released. Thus, it can take as much as an entire refresh period to be able to re-use resources which have been reserved. This means that the reservation soft state is maintained longer than necessary, preventing utilization of resources in the interior nodes during this time. A trade-off must be made between the refresh period length and the overhead cost of sending refresh packets. With a shorter period, the interior nodes can react faster to reservations that are no longer used, but this requires more signaling overhead due to the higher frequency at which refresh request packets are sent.

At present, to improve use of RSVP in QoS management, RSVP microflow reservations can be aggregated in the interior network. One example of such solution is known as RSVP aggregation, described in the Request for Comments (RFC) 3175, entitled, "Aggregation of RSVP for IPv4 and IPv6 Reservations", Baker et al., RFC 3175, Standards Track, September 2001. RSVP aggregation uses a combination of reservation softstate and explicit release principles. The edge nodes are either aggregators or deaggregators for RSVP microflows. The aggregators combine the microflows into aggregated flows for each destination (always a deaggregator), and the interior nodes are required to keep state per aggregate flow. The number of flow-states in the interior nodes can be as much as the number of aggregators multiplied by the number of deaggregators. The interior states can be updated (for each new or terminating microflow), and can be explicitly released by the edge nodes. Since the aggregated reservation state can be explicitly released, the time during which unused resources cannot be reserved for other microflows tends to be reduced. However, the aggregated reservation state can be updated at any time after receiving an explicit release request. If this updating time is near the end of the refresh period, the resources will be unavailable for longer than necessary, thus wasting resources in the interior nodes of the network. Moreover, due to the fact that the complete aggregated reservation state must be established, maintained and released at once, it is necessary for the interior nodes to store the ID or identifier of the aggregated reservation request.

SUMMARY OF THE INVENTION

The invention provides an efficient way of establishing, maintaining and releasing either a part of or the entire aggregated reservation state, using a combination of reservation soft state and explicit release principles. Thus, while the method maintains an aggregated reservation state, it still allows per microflow changes to the reservation without keeping explicit state per microflow. Since parts of the aggregated reservation state can be established, maintained and released, it is not necessary to store any identity of the resource request. Moreover, since part of the aggregated reservation state can be explicitly released, the time during which resources cannot be reserved by other requesting services tends to be reduced.

One embodiment of the invention uses a sliding time window algorithm that is split into a number of sub-windows or cells. The sliding window algorithm makes possible fast reaction times, without diminishing the period for refresh requests. Thus, the sliding window algorithm reduces the time during which unused resources are kept reserved. Overhead may be at most one refresh period plus one cell length. When release requests are also used, overhead may be reduced to at most one cell length. While the invention usefully applies to a Diffserv oriented QoS system in an internet network, embodiments of the invention also apply to other kinds of QoS schemes using aggregated reservation soft-states for QoS management.

In one embodiment, the invention comprises a resource management method for a network having interior nodes positioned between ingress and egress nodes, wherein requests to reserve, maintain and release resource units for respectively corresponding data microflows are continually being received by the interior network. The method includes the step of detecting respective requests to reserve, maintain and release resource units arriving at the interior nodes during a selected cell in a sequence of time cells. A first resource count is computed after the selected cell, which represents the cumulative result of all reserve, maintenance, and release requests arriving at the interior network during a first time period defined by a sliding window, wherein the first time period comprises the selected cell and a specified number of additional cells which precede the selected cell in the time cell sequence. The method further includes the steps of reserving a number of resource units corresponding to the computed first count, for a first reservation period following the selected time cell, and sliding the window to define a second time period. The second time period includes the time cell next following the selected cell in the sequence, and excludes the oldest cell of the first time period. A second resource count associated with the second time period is then computed, for use in reserving resource units for a second reservation period following the first reservation period.

Preferably, reservation of resource units for a given one of the microflows is maintained by one or more refresh requests which arrive at specified intervals following the initial reservation request for the given microflow. Each of the specified intervals comprises a refresh period which is equal in length to both the first and second time periods defined by the sliding window. Preferably also, reservation of resource units for the given microflow is released when a corresponding release request arrives at the interior network. A preferred embodiment of the invention comprises the further steps of detecting a release request for the given microflow during a particular time period defined by the window, and then determining whether a refresh request for the given microflow was received during a previous cell included in the particular time period. If so, the number of resource units reserved for the given microflow is subtracted from a resource count associated with the previous cell.

DETAILED DESCRIPTION OF THE PREFERRED EMBODIMENT

Figure 1:
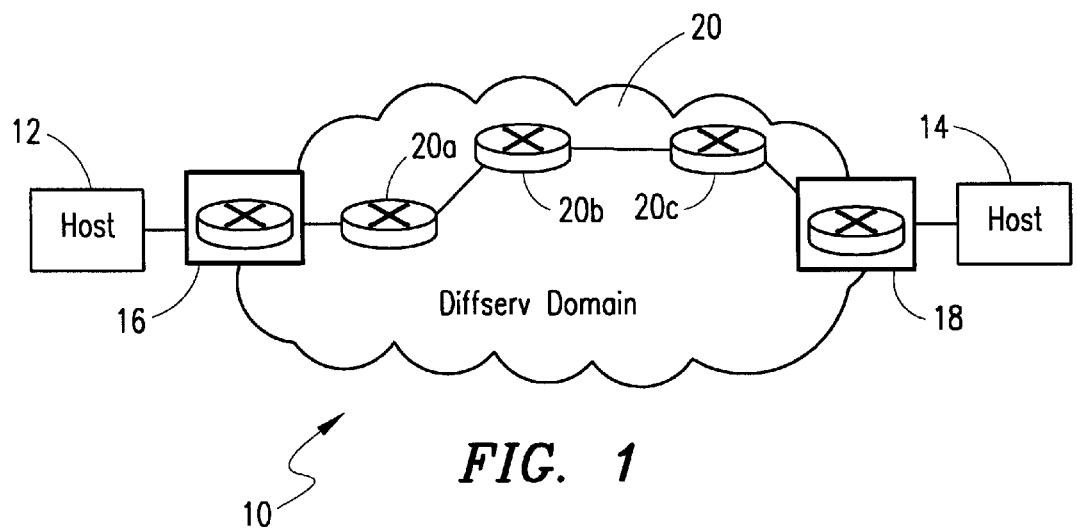
FIG. 1 is a simplified block diagram showing a network in which an embodiment of the invention may be practiced.

Referring to FIG. 1, there is shown an internet network 10 connected between hosts 12 and 14 representing the source and destination, respectively, of continual data microflows directed through the network 10. Network 10 uses QoS management and comprises ingress and egress nodes 16 and 18, collectively comprising edge nodes, and an interior network 20 positioned between the edge nodes. Interior network 20 includes a number of interior nodes exemplified by nodes 20a–20c.

In accordance with an embodiment of the invention, resources are dynamically reserved in network 10 for microflow traffic on a per aggregate basis. As stated above, an aggregate is a bundle of flows, or flows belonging to certain categories or classes of traffic. For example, as is known by those of skill in the art, resources to be reserved within a network for respective microflows could comprise amounts of bandwidth. A particular class of traffic would include all of the microflows that have similar performance demands, such as bandwidth assurance, delay and packet losses. Usually, a class of traffic is predefined and standardised by the IETF standardisation body.

Ingress node 16 of network 10 is a node capable of accepting flows of traffic to be aggregated in respective reservation states or classes within the interior nodes of interior network 20. Egress node 18 is capable of deaggregating microflows from interior network 20 to external nodes (not shown) and each of the interior nodes of interior network 20, such as nodes 20a–20c, can communicate with external nodes only through the ingress and egress nodes. Exterior nodes, which are not shown, are all nodes in network 10 that are not interior, egress or ingress nodes.

It will be seen that interior network 20 is a per aggregate QoS Management System, and is accordingly designated as a Diffserv Domain. However, in an embodiment of the invention an algorithm associated with interior network 20 allows per microflow changes to aggregated resource reservations, without keeping state per microflow, that is, without keeping track of individual microflows.

In the operation of network 10, the ingress node 16 receives resource requests from the external nodes, e.g., host 12, processes them and transforms them into an edge to edge reservation through the intermediate interior nodes of interior network 20. Thus, both ingress and egress nodes keep track of the microflows, but interior nodes do not see individual flows at all. In accordance with the protocol for reservation in the interior network, the ingress node gets a reservation request (e.g. using a per microflow reservation protocol like RSVP) and translates the reservation request into a resource request for the interior network. The reservation request specifies the aggregated state to which it pertains (e.g. using Diffserv DSCP service class). The request further specifies the number of resource units u to be reserved in the interior network for the particular microflow associated with the request. The reservation is carried out by sending a resource request through the interior network 20 to the egress node 18. In the intermediate interior nodes, the request is processed and, provided the resources are available, a change in the specified aggregated reservation state is made.

If a resource request cannot be granted due to lack of resources, the ingress node must be informed and must make sure that the reservation is not continued. For this purpose the interior nodes will mark the request for the egress node, which in turn informs the ingress node about the problem.

Subsequent to the reservation request for a particular microflow, the ingress node must send a refresh request, specifying the amount of units u for the particular microflow, after a fixed time referred to as a refresh period. If the refresh request is not received within the refresh period, the resource reservation for the particular microflow will terminate, and the aggregated state will be reduced by the amount of units u reserved for the particular microflow. This reduction of reserved units occurs without the interior nodes of internet 20 knowing the identity of the microflow for which the units are released.

Figure 2:
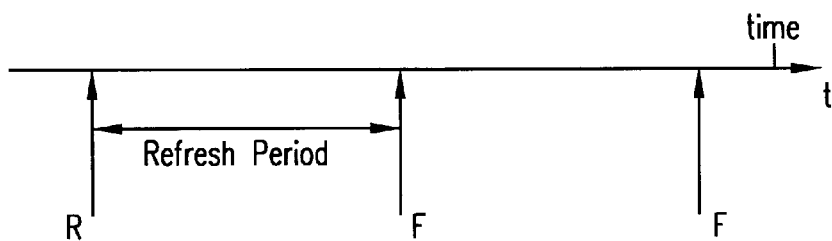
FIGS. 2–5 are timing diagrams, useful for illustrating an embodiment of the invention, which show requests associated with reservation of resources for the network of FIG. 1.

More generally, in order to maintain the reservation of resource units u for a particular microflow, successive refresh requests associated therewith must be received at intervals following the initial reservation request, each interval being equal to the refresh period. This requirement is illustrated in FIG. 2, which shows arrival at the interior network of a reservation request R for a microflow, followed by arrival of periodic refresh requests F at intervals equal to the refresh period.

Figure 3:
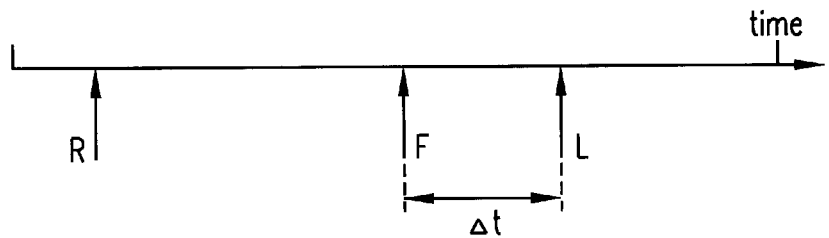

The refresh period determines how long resources are kept reserved after the last refresh request has been received. During this time, these resources cannot be reserved by other flows. From the perspective of signaling overhead, it is desirable to have longer refresh periods, but this has the side effect of reducing the efficiency of the use of resources in the interior nodes. Accordingly, it will be desirable to terminate a particular resource reservation by sending a release request, corresponding to the reservation and its associated microflow. This is illustrated in FIG. 3, which shows arrival of a release request L at the interior network 20, following arrival of the resource request R and a refresh request F. FIG. 3 further shows release request L following the refresh request by a time $\Delta t$. For reasons which will become more apparent hereinafter, a release request L contains or is accompanied by $\Delta t$, the time since the most recent refresh request (or time since the reservation request if there have been no refresh requests). The refresh request also contains the number of resource units u reserved for the associated microflow Since reserved resources cannot be used by other microflows, it is advantageous to release resources associated with the release request as soon as possible, after the request arrives at interior network 20. In particular, it is desirable to avoid waiting until the end of the current refresh period, to see whether or not another refresh request is received. Accordingly, an embodiment of the invention provides a sliding window algorithm, which may be used in connection with a release packet delivering a release request to interior network 20, in order to significantly reduce the release response time.

Figure 4:
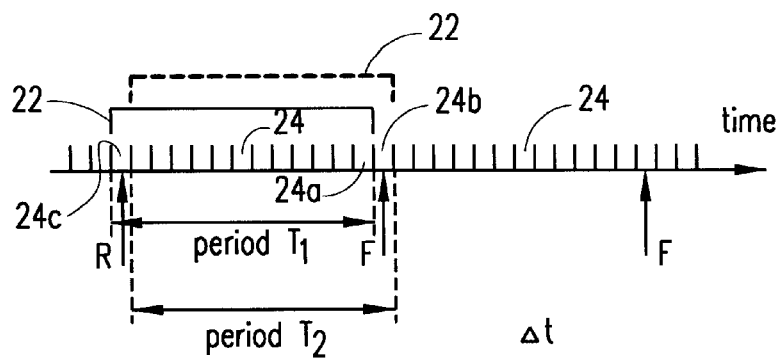

Referring to FIG. 4, there is shown a sliding window 22, which defines a time period having the same length as the refresh period. The window is split or divided into a specified number of time cells 24 in a sequence of time cells. This number can be tuned or adjusted to enhance performance.

FIG. 4 further shows the window 22 depicted as a solid line defining a time period $T_1$, which is exactly equal to one refresh period. The final time cell in time period $T_1$ is the cell 24a. Accordingly, time cell 24a is the current cell, just before the end of time period $T_1$. When cell 24a ends, time period $T_1$ likewise ends and window 22 is slided or shifted by one cell, to the position depicted in FIG. 4 by a dashed line. Window 22 then defines a time period $T_2$, which is again exactly equal to one refresh period. Time period $T_2$ includes time cell 24b, the cell which immediately follows cell 24a in the sequence of cells, and is thus the new current cell. Time period $T_2$ includes all the cells of time period $T_1$, except for the oldest cell thereof, 24c.

The arrangement shown in FIG. 4 is useful in better understanding the sliding window algorithm associated with an embodiment of the invention. In accordance with the algorithm, as disclosed in the Pseudocode of the Algorithm set forth hereafter, an rfcount is derived for cell 24a during the time that cell 24a is the current cell. More particularly, the rfcount is the cumulative total of all resource units which are reserved and refreshed during cell 24a. Thus, the rfcount represents the combined effect of all reservation requests R and refresh requests F which arrive at interior network 20 during cell 24a for respective individual microflows. Note that since the ID of each microflow is not registered the individual microflows can not be distinguished by any interior node.

After the conclusion of cell 24a, the rfcount is combined with a lastsum to determine a newsum. For period $T_1$ the lastsum represents the cumulative total of all resource units reserved, refreshed and released during all the cells of period $T_1$, except current cell 24a. The newsum is derived by adding the rfcount to the lastsum, and subtracting therefrom the resource unit count for the oldest cell 24c. It will be seen that the newsum for time period $T_1$ becomes the lastsum, when window 22 is shifted to define period $T_2$ and when cell 24b becomes the current cell. Thus, by providing the algorithm of the embodiment of the invention, the newsum representing the total number of reserved resource units is updated following each time cell 24. As stated above, the reserved resource units may comprise an amount of reserved bandwidth. Updating this information with the frequency of respective cells can be very useful in enhancing management of resources in network 10.

Figure 5:
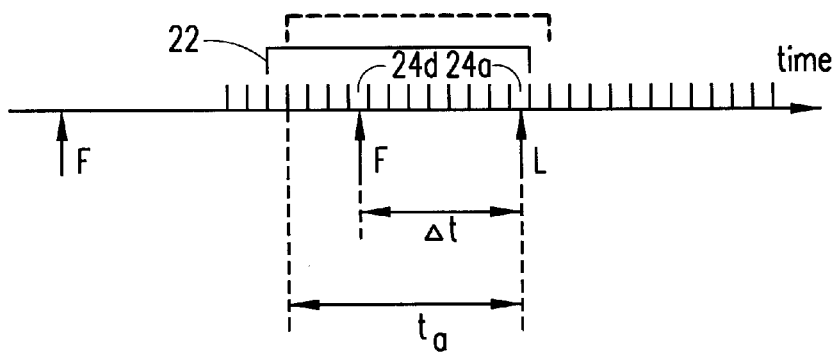

Referring to FIG. 5, there is shown a release request L arriving at interior network 20 during cell 24a of time period $T_1$. When an interior node receives a release request for a particular resource reservation, it stores the arrival time. It then calculates the difference between the arrival time of the release request and the start of the current window, that is, the time period which is currently defined by the window. This value is called $t_a$ in FIG. 5. $t_a$ is then compared with the $\Delta t$ value. If the $\Delta t$ value is smaller, it is known that the most recent refresh request arrived during the current window. Accordingly, the countarray associated to the cell wherein the refresh request was received, is reduced by the number of resource units included in the release request "L" that previously arrived at the interior node. FIG. 5 shows such cell to be cell 24d. The countarray of a cell is an array containing the total number of counted resource units received during the cell. It will be seen that by following the above procedure, the lastsum computed for time period $T_1$, wherein cell 24a is the current cell, is corrected to show the effect of release request L.

If the last refresh request was sent very close to the beginning of the current window, it is difficult to be certain whether the refresh packet was received before or inside the current window. This is because of delay variations in the delivery of the requests. Note that the release request is processed correctly when the variable countarray is not decreased if the last reservation/refresh request associated with this release request was received before the time period in which the release packet was received. The variable countarray should only be decreased if the last reservation/refresh request associated with this release request was received in the same time period as the release request. Moreover, the interior node must not decrease the countarray variable if the Δt is just a little smaller then $t_a$. There may be a configurable constant, based on delay variations of signaling packets, that specifies how much smaller Δt should be before decreasing the countarray variable.

Figure 6:
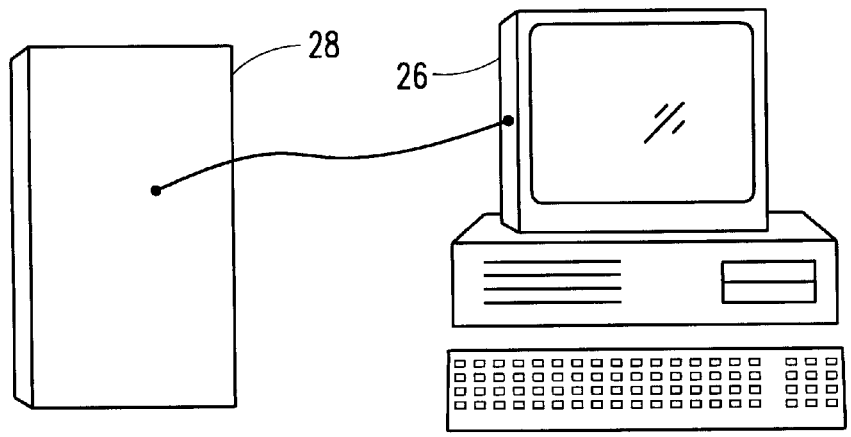
FIG. 6 shows a simplified system which may be used in implementing an embodiment of the invention.

Referring to FIG. 6, there is shown a microprocessor based device, such as computer device 26, and a related data storage apparatus 28. The microprocessor device 26 and storage apparatus 28 can be used in combination to implement an exemplary embodiment of the present invention. For example, instructions stored in the storage apparatus 20 may direct the microprocessor to provide information in accordance with procedures set forth above.

The following is Psuedocode of the Sliding Window Algorithm for implementing an embodiment of the invention.

```
nrofcells = 15                          // number of cells in the periodlength
countarray[0..nrofcells-1] = 0          // exactly nrofcells cells in countarray
rfcount = 0                             // count of refresh/reserve packets in current cell
traffic                                 // external variable representing the traffic for this class
// "invariants" at the cell boundary:
lastsum = sum from i=0 to nrofcells-1 of countarray[i]
// lastsum represents the total amount of reserved bandwidth up to the current cell for a
// complete refresh period-length
newsum = lastsum - countarray[0] + rfcount   // see this as a macro that is constantly up to date!
// newsum is going to be the "lastsum" for the next cell. so the oldest cell is left out
// and the new rfcount (refresh/reserve) value is included.
p = arriving packet
// containing the no. of units and delta t (if p=release req.)
// there are 2 options for which cell p is processed in:
//      a - the cell active at the time of arrival and
//      b - the cell active at the time of processing
//      (a) is preferable from a protocol perspective, but may be more difficult to implement,
//      since it requires an extra check when going to the next cell, to check if there are still
//      packets in the queue for the current cell.
select on p
        case p = reservation packet
            if      p(u) + lastsum <= threshold    //p(u) is number of reserved units
            then    rfcount += p(u)
                    lastsum += p(u)
            else    mark p
            end if
        case p = refresh packet
            if      p(u) + newsum <= threshold
            then    rfcount += p(u)
            else    mark p
            end if
        case p = release packet
            if      lastsum >= p(u)                // can't release more than is reserved
            then    c = find_cell (p(Δt))          // p(Δt) is the time since the last
                                                   // reserve/refresh packet was sent
                    if countarray[c] >= p(u)
                    then    countarray[c] -= p(u)
                    else    countarray[c] = 0      // probably an error, maybe do nothing?
                    lastsum -= p(u)                // update the reserved bandwidth
                    if c > 0 then newsum -= p(u)   // don't change newsum when c is outside
                                                   //    the range of newsum
            else    // do nothing! this is probably an error, so ignore it and let
                    // the softstate handle it.
            end if
end select
on event: cell ends
        slide_window(countarray)    // advance the window to the next cell
        countarray(nrofcells) = rfcount
        lastsum = sum(countarray)   // sum all the cells in countarray
        newsum = lastsum - countarray [0]
        rfcount = 0
function slide_window( a : array ) {
// after this operation, a[0] contains what was previously a[1].
// The same goes for all the other values in a, except for the last, which is set to 0
```

In another embodiment, the section of the pseudocode between "case p=release packet" and "end if" is usefully modified to the following:

```
case p = release packet
    c = find_cell (p(dt))
    if countarray[c] > p(u) then
        countarray [c] -= p(u)
            lastsum -= p(u)
    else
        lastsum -= countarray[c]
            countarray[c] = 0
    end if
    if c = currentcell and rfcount >= p(u) then
        rfcount -= p(u)
            newsum -= p(u)
    else if c = currentcell then
        newsum -= rfcount
            rfcount = 0
    end if
end if
```

Many other modifications and variations of the present invention are possible in light of the above teaching. It is therefore to be understood that within the scope of the disclosed concept, the invention may be practiced otherwise than as has been specifically described.

What is claimed is:

1. In a network arrangement having an interior network which consists of interior nodes, and is positioned between edge nodes, wherein requests belonging to corresponding data microflows that continually arrive at any interior node do not establish any microflow reservation states, but these requests can establish, maintain and release either a part of, or an entire aggregated reservation state, using a combination of reservation soft state and explicit release principles, a method comprising the steps of:

detecting each of said requests arriving at said interior network during a selected time cell in a sequence of time cells;

computing a first resource count after said selected time cell, said first count representing the cumulative result of all reserve, maintenance and release requests arriving at said interior network during a first time period defined by a sliding window, said first time period comprising said selected cell and a specified number of additional time cells preceding said selected cell in said time cell sequence;

reserving a number of resource units corresponding to said first count for a first reservation period following said selected time cell;

sliding said window to define a second time period which includes the time cell next following said selected cell in said sequence, and which excludes the oldest cell of said first time period; and computing a second resource count associated with said second time period for use in reserving resource units for a second reservation period following said first reservation period.

2. The method of claim 1 wherein:

reservation of resource units for a given one of said microflows is maintained by one or more refresh requests arriving at specified intervals following an initial reservation request for said given microflow; and each of said specified intervals comprises a refresh period which is equal in time duration to said first and second time periods.

3. The method of claim 2 wherein:

reservation of resource units for said given microflow is released when a release request therefor arrives at said interior network.

4. The method of claim 3 further comprising the steps of:

detecting a release request for said given microflow arriving during a particular cell included in said first time period;

determining whether a refresh request for said given microflow has arrived during a cell prior to said particular cell and is likewise included in said first time period; and subtracting the number of resource units reserved for said given microflow from a resource count associated with said prior cell if it is determined that a refresh request did arrive during a prior cell included in said first time period.

5. The method of claim 4 wherein determining step comprises:

calculating a first differential comprising the difference between the start of said first time period and the arrival time of said release request for said given microflow;

detecting a second differential comprising the difference between the respective arrival times of the release request and the most recent refresh request for said given micro flow; and comparing said first and second differentials to determine whether to subtract said resource units reserved for said given microflow from said prior cell.

6. The method of claim 5 wherein:

said resource units reserved for said given microflow are subtracted from said prior cell if said first differential is selectively greater than said second differential.

7. The method of claim 4 wherein:

each of said reserve requests arriving at said interior network identifies the service class with which it is associated.

8. The method of claim 1 wherein:

each of said reservation periods has a time duration equal to the duration of respective cells of said sequence.

9. In a network arrangement having an interior network which consists of interior nodes, and is positioned between edge nodes, wherein requests belonging to corresponding data microflows that continually arriving at any interior node do not establish any microflow reservation states, but these requests can establish, maintain and release either a part of, or an entire aggregated reservation state, using a combination of reservation soft state and explicit release principles, a method comprising the steps of:

applying a sliding window to establish a first time period comprising a cell in a sequence of time cells, and further comprising a number of additional cells immediately preceding said selected cell in said sequence;

detecting arrival of reserve and refresh requests during said selected cell to generate a rfcount associated with said sliding window;

combining said rfcount and a lastsum associated with said additional immediately preceding cells of the sliding window to form a newsum of said sliding window for use in managing resources in said interior network during a reservation period corresponding to said selected cell; and sliding said window, following said selected cell, to establish a second time period which includes the cell next following said selected cell in said sequence, and excludes the oldest cell of said first time period.

10. The method of claim 9, wherein:

reservation of resource units for a given one of said microflows is maintained by one or more refresh requests arriving at specified intervals following the initial reservation request for said given microflow; and each of said specified intervals comprises a refresh period which is equal in time duration to said first and second time periods.

11. The method of claim 10 wherein:

reservation of resource units for said given microflow is released when a release request therefor arrives at said interior network.

12. The method of claim 11 further comprising the steps of:

detecting a release request for said given microflow during said first time period; and determining whether a refresh request for said given microflow was received during a previous cell included in said first time period, and if so, subtracting the number of resource units reserved for said given microflow from a countarray associated with said previous cell.

13. An article of manufacture for reserving, maintaining and releasing resources in the interior nodes located within an interior network positioned between edge nodes, wherein requests belonging to corresponding data microflows that continually arrive at any interior node do not establish any microflow reservation states, but these requests can establish, maintain and release either a part of, or an entire aggregated reservation state, using a combination of reservation soft state and explicit release principles, said article of manufacture comprising:

a computer readable medium;

a plurality of instructions wherein at least a portion of said plurality of instructions are storable in said computer readable medium, and further wherein said plurality of instructions are configured to cause a processor to:

apply a sliding window to establish a first time period comprising a selected cell in a sequence of time cells, and further comprising a number of additional cells immediately preceding said selected cell in said sequence;

generate a rfcount associated with arrival of reserve and refresh requests during said selected cell of the current sliding window;

combine said rfcount with a lastsum associated with said additional immediately preceding cells of the sliding window to form a newsum of said sliding window for use in managing resources in said interior network during a reservation period corresponding to said selected cell; and slide said window, following said selected cell, to establish a second time period which includes the cell next following said selected cell in said sequence, and excludes the oldest cell of said first time period.

14. The article of manufacture of claim 13 wherein:

reservation of resource units for a given one of said microflows is maintained by one or more refresh requests arriving at specified intervals following the initial reservation request for said given microflow; and each of said specified intervals comprises a refresh period which is equal in time duration to said first and second time periods.

15. The article of manufacture of claim 14 wherein:

reservation of resource units for said given microflow is released when a release request therefor arrives at said interior network.

16. The article of manufacture of claim 15 wherein a release request for said given microflow is detected during said first time period, and wherein:

said processor determines whether a refresh request for said given microflow was received during a previous cell included in said first time period, and if so, subtracts the number of resource units reserved for said given microflow from a countarray associated with said previous cell.

* * * * *